United States Patent
Shah et al.

(10) Patent No.: US 6,258,279 B1
(45) Date of Patent: Jul. 10, 2001

(54) HYDROPHILIC CATIONIC DISPERSION POLYMER FOR PAPER MILL COLOR REMOVAL

(75) Inventors: Jitendra Shah, Naperville, IL (US); Richard E. Metzgar, Murphreesoboro, TN (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/379,038

(22) Filed: Aug. 23, 1999

Related U.S. Application Data

(63) Continuation-in-part of application No. 09/065,773, filed on Apr. 24, 1998, now abandoned.

(51) Int. Cl.$^7$ .................................................. C02F 1/56
(52) U.S. Cl. .................... 210/734; 210/735; 210/917; 210/928; 162/189
(58) Field of Search .................... 210/705, 725, 210/727, 728, 734, 735, 917, 928; 162/189

(56) References Cited

U.S. PATENT DOCUMENTS

| | | |
|---|---|---|
| 3,894,946 | 7/1975 | Panzer et al. . |
| 3,953,330 | 4/1976 | Tonkyn et al. . |
| 4,151,202 | 4/1979 | Hunter et al. . |
| 4,155,847 | 5/1979 | Tanaka et al. . |
| 4,450,092 | 5/1984 | Huang . |
| 4,668,403 | 5/1987 | Walterick, Jr. et al. . |
| 4,734,473 | 3/1988 | Fong et al. . |
| 4,769,432 | 9/1988 | Fong . |
| 4,800,039 | 1/1989 | Hassick et al. . |
| 4,802,992 | 2/1989 | Fong et al. . |
| 4,851,128 | 7/1989 | Rose . |
| 4,929,655 | 5/1990 | Takeda et al. . |
| 4,968,435 | 11/1990 | Neff et al. . |
| 5,006,590 | 4/1991 | Takeda et al. . |
| 5,006,596 | 4/1991 | Chen et al. . |
| 5,152,903 | 10/1992 | Neff et al. . |
| 5,200,089 | 4/1993 | Siefert et al. . |
| 5,314,627 | 5/1994 | Ramesh et al. . |
| 5,338,816 | 8/1994 | Ramesh et al. . |
| 5,435,922 | * 7/1995 | Ramesh et al. .................. 210/734 |
| 5,587,415 | 12/1996 | Takeda . |
| 5,708,071 | 1/1998 | Takeda . |
| 5,750,034 | 5/1998 | Wong Shing et al. . |
| 5,938,937 | * 8/1999 | Sparapany et al. ............... 210/728 |
| 6,019,904 | * 2/2000 | Wong Shing et al. ............. 210/705 |
| 6,036,868 | * 3/2000 | Sivakumar et al. ............... 210/708 |
| 6,071,379 | * 6/2000 | Wong Shing et al. ............. 162/183 |

FOREIGN PATENT DOCUMENTS 61-106072   8/1995   (JP) .

OTHER PUBLICATIONS

NCASI Stream Improvement Technical Bulletin No. 253, Dec. 1971; "An Investigation of Improved Procedures for Measurement of Mill Effluent and Receiving Water Color", pp. 1–47, Dr. Isaiah Gellman, Technical Director.

* cited by examiner

Primary Examiner—Peter A. Hruskoci
(74) Attorney, Agent, or Firm—Michael B. Martin; Thomas M. Breininger

(57) ABSTRACT

This invention is directed to a method of removing color bodies from paper mill waste water comprising adding to the water an effective color-removing amount of a hydrophilic cationic dispersion polymer prepared by polymerizing i. a cationic diallyl-N,N-disubstituted ammonium monomer of formula $$(H_2C=CHCH_2)_2N^+R_1R_2X^-$$

wherein $R_1$ and $R_2$ are independently $C_1$–$C_{20}$ alkyl, aryl, alkylaryl or arylalkyl and X is an anionic counterion and ii. an acrylamide monomer of formula $$R_3CR_4=CR_5-\overset{O}{\underset{\|}{C}}NR_6R_7$$

wherein $R_3$ and $R_4$ are independently hydrogen, $C_1$–$C_{10}$ alkyl, aryl or arylalkyl; $R_5$ is hydrogen or methyl and $R_6$ and $R_7$ are independently hydrogen or $C_1$–$C_{10}$ alkyl, in an aqueous solution of a polyvalent anionic salt wherein the polymerization is carried out in the presence of a dispersant.

7 Claims, No Drawings

HYDROPHILIC CATIONIC DISPERSION POLYMER FOR PAPER MILL COLOR REMOVAL

CROSS REFERENCE TO RELATED APPLICATIONS

This is a continuation-in-part of U.S. Ser. No. 09/065,773, filed Apr. 24, 1998 now abandoned.

TECHNICAL FIELD

This invention concerns a method of removing color bodies from paper mill waste water using a hydrophilic cationic dispersion polymer.

BACKGROUND OF THE INVENTION

Color removal from the effluent streams of paper mills continues to be a problem within the pulp and paper industry. It is necessary that these downstream waste waters be treated for color removal prior to disposal.

The United States wood pulp production capacity is approximately 60 million tons per year. Since the average cellulose content of wood is about 40%, 150 million tons of wood is needed to produce this 60 tons of pulp. The difference between these two numbers represents the lignin and hemicellulose that must be removed or separated in the pulping process in order to free the cellulose fibers.

The pulping process, however, does not remove 100% of the lignin present in the wood, with approximately 5% remaining after either Kraft or sulfite pulping (for mechanical pulping the amount is considerably higher). If a high grade paper is the desired end product, then this 5% residual lignin must be removed by bleaching the pulp.

Since over 35% of the pulp produced in the United States is bleached, there are about one million tons of lignin removed each year at the bleach plant, and most of this in the caustic extraction stage. This number is significant because in the residual lignin is solubilized. This solubilized lignin is a strong absorber of visible radiation resulting from the conjugation of unsaturated and quinodal moieties formed during the oxidation step in the bleach plant. Consequently, the bleach plant effluent is highly colored. Although there are other sources of color in paper mill waste effluent, it is readily apparent that where bleaching is performed its effluent can be expected to be the major contributor of waste color. Indeed, at Kraft, bleach mills the effluent from the first caustic extraction stage accounts for at least 70% of the waste color.

The goal of the pulping and bleaching operations is the removal of lignin and hemicellulose from the cellulose fiber in wood. The 95% removed by pulping is often burned as fuel in the process of recovering the inorganic chemicals present in the black liquor. In the bleaching operation, the 5% residual lignin is separated from the fibers by degradation and solubilization and ends up in the wastewater. Chemical removal can, therefore, only be accomplished by reducing this solubility, which has proved to be a difficult task.

Therefore, the primary source of color in pulp is lignin. It has also been suggested that Kraft color is due to ketoenols produced from carbohydrates during the Kraft cook stage in the papermaking process. Chlorination of the pulp during the bleaching operation results in the formation of color bodies which are leached from the pulp by caustic alkali solutions. Thus, the caustic extract effluent contains a major proportion of the color bodies and the other organic materials which have to be disposed during the waste water treatment.

The process of color removal from the effluent stream is further complicated by the presence of lime, solid particulate matter like pulp, clay, dispersants/surface active materials and polymers used during various stages in the papermaking process. The solid particulate matter is commonly referred to as anionic trash.

Most governmental regulations pertaining to color removal from the effluent stream of a papermaking process are directed to true color, i.e., the color at pH of 7.6 after filtration through a 0.8 micrometer filter paper and expressed as Pt Co color units (i.e., platinum cobalt color using a DR2000 spectrophotometer). Nevertheless, there is increasing pressure on pulp and paper mills to lower the apparent color of the effluent water because that is the color visible to the naked eye. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

It has been shown that by-products are water soluble, and that a significant amount is produced. This puts severe demands on chemicals to be used for color removal. There are techniques already available, however, that can remove greater than 90% of the color from either total mill effluent or isolated waste streams, such as from the caustic extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). None enjoys widespread use because of unfavorable economics.

The demands on a product used in a color removal application are quite severe, i.e., the product must be capable of reacting with the color bodies in a manner which results in their becoming insoluble and, because of the extremely large amount produced, the color removal product must work at very low weight ratios relative to the material being removed or its use will be precluded by prohibitive costs.

Conventional treatments for color removal include use of ferrous sulfate and a water-soluble cationic amine polymer as disclosed in U.S. Pat. No. 5,200,089; use of hydrophobic polyelectrolytes in U.S. Pat. Nos. 5,338,816 and 5,314,627; and use of hydrophobic dispersion polymers in U.S. Pat. No. 5,435,922.

A common problem associated with conventional chemical treatment methods, such as epichlorohydrin/-dimethylamine (Epi/DMA), is the fact those polymers cannot lower the color of a system below a certain value beyond which they tend to re-disperse the color. This problem is commonly referred to as "overdosage."

SUMMARY OF THE INVENTION

We have discovered that certain low molecular weight water soluble cationic dispersion polymers can be used to successfully remove color from pulp and paper waste water effluents. These dispersion polymers are excellent agents for the removal of both "apparent" and "true" color pulp and paper mill waste water. The color removal characteristics of polyacrylamide is significantly improved by imparting a certain degree of hydrophilicity to the polymer. This modification is accomplished by copolymerizing acrylamide with certain hydrophilic cationic monomers. The resulting hydrophilic cationic dispersion polymers display excellent replacement ratios, while avoiding the problem of "overdosage" which frequently arises when conventional polymers are used to remove color. These hydrophilic cationic dispersion polymes have a unique mode of action resulting in an all organic treatment for removal of color in pulp and paper mill waste water.

The hydrophilic cationic dispersion polymer described herein confers additional advantages for use in a paper wastewater treatment process. Specifically, the hydrophilic dispersion polymers of the invention show improved or equal activity with respect to color removal performance without the unwanted addition of oils and surfactants as compared to conventional cationic latex polymers. Additionally, these hydrophilic cationic dispersion polymers require no inverter system and can be introduced to the papermaking process using simple feeding equipment.

Another advantage concerns the mode of addition of the hydrophilic cationic dispersion polymers. In most cases, conventional water-soluble polymers are now commercially available in a powder form. Prior to use, the polymeric powder must be dissolved in an aqueous medium for actual application. The polymer swells in aqueous medium, and the dispersed particles flocculate. It is typically very difficult to dissolve the conventional polymers in an aqueous medium. By contrast, the hydrophilic cationic dispersion polymers of this invention, by their nature, avoid dissolution-related problems.

Furthermore, the hydrophilic cationic dispersion polymers of this invention may be used either as the sole polymeric treatment, or as a component in a conventional dual polymer program which requires both a conventional coagulant and a flocculent. The polymers of this invention may be utilized in conjunction with other treatment agents such as alum, ferrous sulfate or other coagulants.

Accordingly, in its principle aspect, this invention is directed to a method of removing color bodies from paper mill waste water comprising adding to the water an effective color-removing amount of a hydrophilic cationic dispersion polymer prepared by polymerizing i. a cationic diallyl-N,N-disubstituted ammonium monomer of formula

wherein $R_1$ and $R_2$ are independently $C_1$–$C_{20}$ alkyl, aryl or arylalkyl and X is an anionic counterion and ii. an acrylamide monomer of formula

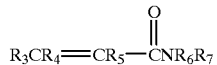

wherein $R_3$ and $R_4$ are independently hydrogen, $C_1$–$C_{10}$ alkyl, aryl or arylalkyl;

$R_5$ is hydrogen or methyl and $R_6$ and $R_7$ are independently hydrogen or $C_1$–$C_{10}$ alkyl, in an aqueous solution of a polyvalent anionic salt wherein the polymerization is carried out in the presence of a dispersant.

DETAILED DESCRIPTION OF THE INVENTION

"Monomer" means a polymerizable allylic, vinylic or acrylic compound.

"Cationic diallyl-N,N-disubstituted ammonium monomer" means a compound of formula $(H_2C=CHCH_2)_2N^+$ $R_1R_2X^-$ wherein $R_1$ and $R_2$ are independently $C_1$–$C_{20}$ alkyl, aryl, alkylaryl or arylalkyl and X is an anionic counterion. Diallyl-N,N-disubstituted ammonium monomers are well-known and commercially available from a variety of sources. Representative cationic diallyl-N,N-disubstituted ammonium halide monomers include N-methyl-N-ethyl-N, N-diallyl ammonium chloride and diallyldimethyl ammonium chloride (DADMAC). A preferred cationic diallyl-N, N-disubstituted ammonium monomer is DADMAC.

"Anionic counterion" means any organic or inorganic anion which neutralizes the positive charge on the quaternary nitrogen atom of the cationic diallyl-N,N-disubstituted ammonium monomer. Representative anionic counterions include halogen, sulfate, phosphate, monohydrogen phosphate, nitrate, and the like. A preferred anionic counterion is halogen.

"Acrylamide monomer" means a monomer of formula

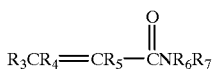

wherein $R_3$ and $R_4$ are independently hydrogen, $C_1$–$C_{10}$ alkyl, aryl or alkylaryl; $R_5$ is hydrogen or methyl and $R_6$ and $R_7$ are independently hydrogen or $C_1$–$C_{10}$ alkyl. Representative acrylamide monomers inlcude acrylamide, (meth) acrylamide, ethyl hexyl (meth)acrylamide, diethylaminopropyl (meth)acrylamide, dimethylaminohydroxypropyl (meth)acrylamide, N-isopropyl (meth)acrylamide, N-tert-butyl (meth)acrylamide, $C_1$–$C_{10}$ N-alkyl acrylamide, $C_1$–$C_{10}$ N-alkyl methacrylamide, N-aryl acrylamide, N-aryl methacrylamide, N-arylalkyl acrylamide, N-isopropyl (meth)acrylamide, N,N-dimethylacrylamide (meth) acrylamide, $C_1$–$C_{10}$ N,N-dialkyl acrylamide, $C_1$–$C_{10}$ N, N-dialkyl methacrylamide, N,N-diaryl acrylamide, N,N-diaryl methacrylamide, N,N-diallylalkyl acrylamide, and N,N-diarylalkyl methacrylamide, and the like. Acrylamide and (meth)acrylamide are preferred, acrylamide is more preferred.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

"Alkoxy" and "alkoxyl" mean an alkyl-O-group wherein alkyl is defined herein. Representative alkoxy groups include methoxyl, ethoxyl, propoxyl, butoxyl, and the like.

"Alkylene" denotes a divalent group derived from a straight or branched chain saturated hydrocarbon by the removal of two hydrogen atoms. Representative alkylene groups include methylene, 1,2-ethylene, 1,1-ethylene, 1,3-propylene, 2,2-dimethylpropylene, and the like.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy, halogen or haloalkyl groups. Representative aryl groups include phenyl or naphthyl, or substituted phenyl or substituted naphthyl. A preferred substituent is alkyl.

"Arylene" means an aromatic monocyclic or multicyclic ring system derived from an aryl as defined herein by the removal of two hydrogen atoms.

"Arylalkyl" means an aryl-alkylene-group wherein aryl and alkylene are defined herein. Representative arylalkyl include benzyl, phenylethyl, phenylpropyl, 1-naphthylmethyl, and the like. Preferred arylalkyl are benzyl and phenethyl.

"Alkylaryl" means an alkyl-arylene-group where alkyl and arylene are defined herein. Representative alkylaryl include tolyl, ethylphenyl, propylphenyl, nonylphenyl, and the like.

"Halogen" means fluorine, chlorine, bromine or iodine.

"Haloalkyl" means an alkyl group, as defined herein, having one, two, or three halogen atoms attached thereto. Representative haloalkyl groups include chloromethyl, bromoethyl, trifluoromethyl, and the like.

"Dispersion polymer" means a water-soluble polymer dispersed in an aqueous continuous phase containing one or more inorganic salts. Representative examples of dispersion polymerization of water-soluble polymers in an aqueous continuous phase can be found in the following references: Takeda, H.; Kawano, C. U.S. Pat. No. 4,929,655; Takeda, H.; Kawano, C. U.S. Pat. No. 5,006,590; Hurlock, J. R.; Ramesh, M. U.S. Pat. No. 5,597,859; Werges, D. L., Ramesh, M. Eur. Patent 657,478; Ramesh, M., Cramm, J. R., Werges, D. L., Howland, C. P. U.S. Pat. No. 5,597,858; Ramesh, M., Howland, C. P., Cramm, J. R. Eur. Patent 630,909.

"Cationic dispersion polymer" means a dispersion polymer as defined herein possessing a net positive charge.

The hydrophilic cationic dispersion polymers for use in this invention are prepared by preparing a mixture of water, one or more polyvalent anionic salts, an acrylamide monomer, a ationic diallyl-N,N-disubstituted ammonium monomer, any polymerization additives such as chelants, pH buffers or chain transfer agents and a dispersant and charging the mixture to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. During the course of the reaction, a discontinuous phase containing the water-soluble polymer is formed. After this time, the products are cooled to room temperature, and any post-polymerization additives are charged to the reactor. The cationic dispersion polymer is a free flowing liquid with product viscosities generally 100–10,000 centipoises, as measured at low shear.

Polyvalent anionic salts suitable for preparing the cationic dispersion polymer include inorganic or organic sulfates, phosphates or a mixture thereof. Preferred salts anionic salts include ammonium sulfate, sodium sulfate, magnesium sulfate, aluminum sulfate, ammonium hydrogen phosphate, sodium hydrogen phosphate and potassium hydrogen phosphate. The salts are used in aqueous solution having a concentration of 15% or above.

Suitable dispersants include water-soluble high molecular weight cationic polymers. The dispersant is preferably soluble in the aqueous salt solution. The dispersant is used in an amount of from about 1 to about 10% by weight based on the total weight of the hydrophilic dispersion polymer.

Representative dispersants include homopolymers of cationic diallyl-N,N-disubstituted ammonium monomers or N,N-dialkyl-aminoethyl(meth)acrylate monomers and their quaternary salts and cationic polymers comprising 20 mole % or more of cationic diallyl-N,N-disubstituted ammonium monomers or N,N-dialkyl-aminoethyl(meth)acrylate monomers and their quaternary salts and one or more nonionic monomers, preferably acrylamide or (meth)acrylamide. The performance of the dispersant is not greatly affected by molecular weight. However, the molecular weight of the dispersant is preferably in the range of about 10,000 to 10,000,000. Preferred dispersants include homopolymers of diallyldimethyl ammonium chloride, dimethylaminoethylacrylate methyl chloride quaternary salt and dimethylaminoethylmethacrylate methyl chloride quaternary salt.

A multifunctional alcohol such as glycerin or polyethylene glycol may also be included in the polymerization system. The deposition of the fine particles is smoothly carried out in the presence of these alcohols.

The polymerization reaction is initiated by any means which results in generation of a suitable free-radical. Thermally derived radicals, in which the radical species results from thermal, homolytic dissociation of a water-soluble azo, peroxide, hydroperoxide and perester compound are preferred. Especially preferred initiators are azo compounds including 2,2'-azobis( 2-amidinopropane)dihydrochloride and 2,2'-azobis(N,N'-dimethyleneisobutylamine) hydrochloride, and the like.

A seed polymer may be added to the reaction mixture before the initiating polymerization of the monomers for the purpose of obtaining a fine dispersion. The seed polymer is a water-soluble cationic polymer insoluble in the aqueous solution of the polyvalent anion salt. The monomer composition of the seed polymer need not be identical to that of the water-soluble cationic polymer formed during polymerization. However, the seed polymer should contain at least 5 mole percent of cationic diallyl-N,N-disubstituted ammonium monomer. The seed polymer is preferably a polymer prepared from the above monomer mixture by the process described herein.

The cationic dispersion polymers used in the method of this invention comprise from about 1 about 99 mole percent acrylamide monomer and from about 99 to about to about 1 mole percent diallyl-N,N-disubstituted ammonium monomer.

In a preferred aspect, the cationic diallyl-N,N-disubstituted ammonium monomer is diallyldimethyl ammonium chloride and the acrylamide monomer is acrylamide.

In another preferred aspect, the hydrophilic dispersion polymer has a cationic charge of from about 1 mole % to about 50 mole %.

In another preferred aspect, the dispersion polymer is added to the paper mill waste water in an amount of from about 1 to about 100 ppm.

In a more preferred aspect, the hydrophilic dispersion polymer has an intrinsic viscosity of from about 0.5 to about 10 deciliters per gram as measured in 1 molar sodium nitrate for an 0.045% polymer solution.

In still more preferred aspect, the hydrophilic dispersion polymer has an intrinsic viscosity of from about 1.5 to about 8.5 deciliters per gram as measured in 1 molar sodium nitrate for an 0.045% polymer solution.

In a still yet more preferred aspect, the hydrophilic dispersion polymer has an intrinsic viscosity of from about 2.5 to about 7.5 deciliters per gram as measured in 1 molar sodium nitrate for an 0.045% polymer solution.

In the conventional pulp paper manufacturing process, the effluent stream from the process contains a large quantity of color bodies. These color bodies are generally lignins, lignin degradation products or humic acids. These color bodies impart a dark color to the effluent stream. This color is expressed in Pt—Co units and is referred to as its True Color. The method for measuring True Color is standardized by the National Council of Air and Stream Improvement (NCASI) of the Pulp and Paper Industry. This method for determining True Color is used herein to demonstrate the effectiveness of the present invention. The method is described fully in *An Investigation of Improved Procedure for Measurement of*

*Mill Effluent and Receiving Water Color*, NCASI Technical Bulletin No. 2538, December 1971 incorporated herein by reference. NCASI method for measuring True Color is as follows. A sample of the effluent stream is obtained and the pH of the stream is adjusted to pH 7.6. The sample is thereafter filtered through a 0.8 micron membrane to remove flocculated or suspended solids. The absorbance of this sample is then determined at 465 nm in a spectrophotometer. This absorption is related to a calibrated curve which is expressed in Pt—Co units. The True Color of this sample is read from this absorbance curve as Pt—Co units.

The color of the effluent stream can also be expressed as "apparent color". Apparent color is generally determined without treating the sample, as required in True Color evaluation. For purposes of the invention, apparent color is a function of the turbidity of the effluent stream at an unadjusted pH. The turbidity is typically measured in FTUs (Formazin Turbidity Units) by the Hach absorptometric method. This method measures the extiction of light at 450 nanometers in a spectrophotometer. The polymer may be added undiluted to the effluent prior to a solids/liquid separation step. The dosage will depend upon the particular system to be treated, but is generally in the range of from about 1 to about 100 ppm.

The foregoing may be better understood by the following Examples, which are presented for purposes of illustration and are not intended to limit the scope of the invention.

EXAMPLE 1

A representative dispersion copolymer of diallyldimethyl ammonium chloride and acrylamide in 30/70 mole ratio is synthesized as follows:

25.667 g of a 49.0% solution of acrylamide (0.1769 moles), 161.29 g of a 62.0% solution of DADMAC (0.6192 moles), 200 g of ammonium sulfate, 40 g of sodium sulfate, 303.85 g of deionized water, 0.38 g of sodium formate, 45 g of a 20% solution of poly(DMAEA.MCQ) (dimethylaminoethylacrylate methyl chloride quaternary salt, IV=2.0 dl/gm) and 0.2 g of EDTA are added to a two liter resin reactor equipped with a stirrer, temperature controller, and water cooled condenser. The mixture is heated to 48° C. and 2.50 g of a 4% solution of 2,2'-azobis (2-amidinopropane)dihydrochloride and 2.50 g of a 4% solution of 2,2'-azobis(N,N'-dimethylene isobutryramidine) dihydrochloride are added. The resulting solution is sparged with 1000 cc/min of nitrogen. After 15 minutes, polymerization begins and the solution becomes viscous. Over the next 4 hours, the temperature is maintained at 50° C. and a solution containing 178.42 g of 49.0% AcAm (1.230 moles) and 0.2 g of EDTA is pumped into the reactor using a syringe pump. The resulting polymer dispersion has a Brookfield viscosity of 4200 cps. The dispersion is then further reacted for 2.5 hours at a temperature of 55° C. The resulting polymer dispersion has a Brookfield viscosity of 3300 cps. Ten g of 99% adipic acid, 10 g of ammonium sulfate and 12.5 g of a 60% aqueous solution of ammonium thiosulfate are then added to the polymer dispersion. The resulting dispersion has a Brookfield viscosity of 1312.5 cps and contains 20% of a 50 weight percent copolymer of DADMAC and AcAm with an intrinsic viscosity of 6.32 dl/gm as measured in 1.0 molar $NaNO_3$ for an 0.045% polymer solution.

EXAMPLE 2

The hydrophilic cationic dispersion polymers synthesized according to the procedure described in Example 1 are evaluated for their color removal abilities in waste water obtained from a paper mill. True Color and apparent color are measured by the NCASI method using a Hach DR2000 spectrophotometer.

The trials are all conducted as follows. A series of 250 ml samples of wastewater from a pulp paper mill effluent stream are placed in a 400 ml beakers. These beakers are placed in a gang stirrer where all the beakers are mixed at the same speed of the impeller. A mechanical mixer is used for mixing each of these beakers. The treatment to be tested is then added at various dosages to the wastewater beakers. After the addition of appropriate dose of the treatment the beakers are mixed at 300 rpm for one minute followed by five minutes at 50 rpm (slow mix). At the end of slow mix, the stirring is stopped and the samples are allowed to settle for 10 to 15 minutes. Samples of supernatant are drawn from each of the beakers. The True Color and Apparent Color of the supernatants is measured. For each of these characteristics, a lower number indicates greater efficiency of color body removal.

Polymers A–I are available from Nalco Chemical Co., of Naperville, Ill.

Polymer A is a dispersion polymer poly(DMAEA.BCQ/ Acrylamide), 10/90 mole ratio.

Polymer B is a dispersion polymer poly(DMAEA.MCQ/ DMAEA.BCQ/Acrylamide), 10/25/65 mole ratio.

Polymer C is a poly(DMAEA.MCQ/DMAEA.BCQ/ Acrylamide) dispersion polymer, 30/50/20 mole ratio.

Polymer D is a poly (DADMAC/Acrylamide) dispersion polymer, 50/50 mole ratio, prepared as described herein.

Polymer E is a solution epichlorohydrin/dimethylamine (epi-DMA) homopolymer (linear), molecular weight 20,000.

Polymer F is a solution epi-DMA homopolymer (cross linked), molecular weight 75,000–100,000.

Polymer G is a solution poly(DADMAC), molecular weight 100,000.

Polymer H is a solution poly(DADMAC), molecular weight 150,000.

Polymer I is a solution ethylene dichloride/ammonia (EDC/$NH_4$) polymer, molecular weight 60,000.

Polymer J is a solution of epi-DMA homopolymer (cross linked), molecular weight 60,000.

Inventive dispersion polymer D is compared to conventional dispersion polymers A–C and also to solution polymers E–J. As evidenced by the data in Tables 1 and 2, the hydrophilic dispersion polymers are superior. Of note is the fact that much larger doses of the solution polymers are required in order to obtain comparable or better color removal. Therefore, D polymers are more efficient since good results can be obtained at lower dosages than with the conventional solution polymer treatments.

TABLE 1

Apparent Color Comparison

| Dose (ppm) | Treatment | | | | | | | | |
|---|---|---|---|---|---|---|---|---|---|
| | A | B | C | D | E | F | G | H | I |
| 0 | 1125 | 1125 | 1125 | 1125 | 1125 | 1125 | 1125 | 1125 | 1125 |
| 5 | 1114 | 1173 | 951 | 803 | — | — | — | — | — |
| 10 | 968 | 1133 | 921 | 591 | 1189 | 1193 | 1129 | — | 1097 |
| 15 | 938 | 1153 | 928 | 815 | — | — | — | — | — |

TABLE 1-continued

Apparent Color Comparison

| Dose | Treatment | | | | | | | | |
|---|---|---|---|---|---|---|---|---|---|
| (ppm) | A | B | C | D | E | F | G | H | I |
| 20 | — | — | — | — | 555 | — | — | — | 1121 |
| 30 | — | — | — | — | 513 | 729 | 1128 | 999 | 1156 |
| 40 | — | — | — | — | 1029 | — | — | — | 1129 |
| 50 | — | — | — | — | 1352 | 506 | 912 | 714 | 989 |
| 60 | — | — | — | — | 1939 | — | — | — | 415 |

TABLE 2

True Color Comparison

| Dose | Treatment | | | | | | | | |
|---|---|---|---|---|---|---|---|---|---|
| (ppm) | A | B | C | D | E | F | J | G | H |
| 0 | 351 | 351 | 351 | 351 | 351 | 351 | 351 | 351 | 351 |
| 5 | 271 | 312 | 335 | 207 | — | — | — | — | — |
| 10 | 223 | 285 | 322 | 195 | 246 | 331 | 296 | 374 | 396 |
| 15 | 221 | 244 | 331 | 177 | — | — | — | — | — |
| 20 | — | — | — | — | 134 | — | — | — | — |
| 30 | — | — | — | — | 125 | 170 | 169 | 230 | 230 |
| 40 | — | — | — | — | 113 | — | — | — | — |
| 50 | — | — | — | — | 89 | 144 | 141 | 172 | 175 |
| 60 | — | — | — | — | 60 | — | — | — | — |

Changes can be made in the composition, operation and arrangement of the method of the present invention described herein without departing from the concept and scope of the invention as defined in the following claims:

What is claimed is:

1. A method of removing color bodies including lignins, lignin degradation products, or humic acids from paper mill waste water comprising adding to the water an effective color-removing amount of a hydrophilic cationic dispersion polymer prepared by polymerizing
   i. a cationic diallyl-N,N-disubstituted ammonium halide of formula

$(H_2C=CHCH_2)_2N^+R_1R_2X^-$ wherein $R_1$ and $R_2$ are independently $C_1$–$C_{20}$ alkyl, aryl or arylalkyl and X is an anionic counterion and
   ii. an acrylamide monomer of formula

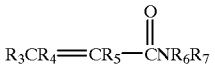

$$R_3CR_4=CR_5-CNR_6R_7$$
$$\phantom{R_3CR_4=CR_5-C}\|\phantom{NR_6R_7}$$
$$\phantom{R_3CR_4=CR_5-}O$$

wherein
$R_3$ and $R_4$ are independently hydrogen, $C_1$–$C_{10}$ alkyl, aryl or arylalkyl;
$R_5$ is hydrogen or methyl and
$R_6$ and $R_7$ are independently hydrogen or $C_1$–$C_{10}$ alkyl,
in an aqueous solution of a polyvalent anionic salt wherein the polymerization is carried out in the presence of a dispersant, and removing said color bodies from said waste water.

2. The method of claim 1 wherein the cationic diallyl-N,N-disubstituted ammonium monomer is diallyldimethyl ammonium chloride and the acrylamide monomer is acrylamide.

3. The method of claim 1 wherein the hydrophilic cationic dispersion polymer has a cationic charge of from about 1 mole % to about 50 mole %.

4. The method of claim 1 wherein the hydrophilic cationic dispersion polymer has an intrinsic viscosity of from about 0.5 to about 10 deciliters per gram as measured in 1 molar sodium nitrate for an 0.045% polymer solution.

5. The method of claim 1 wherein the hydrophilic cationic dispersion polymer has an intrinsic viscosity of from about 1.5 to about 8.5 deciliters per gram as measured in 1 molar sodium nitrate for an 0.045% polymer solution.

6. The method of claim 1 wherein the hydrophilic cationic dispersion polymer has an intrinsic viscosity of from about 2.5 to about 7.5 deciliters per gram as measured in 1 molar sodium nitrate for an 0.045% polymer solution.

7. The method of claim 1 wherein the hydrophilic cationic dispersion polymer is added to the waste water in an amount of from about 1 to about 100 ppm.

* * * * *